UNITED STATES PATENT OFFICE.

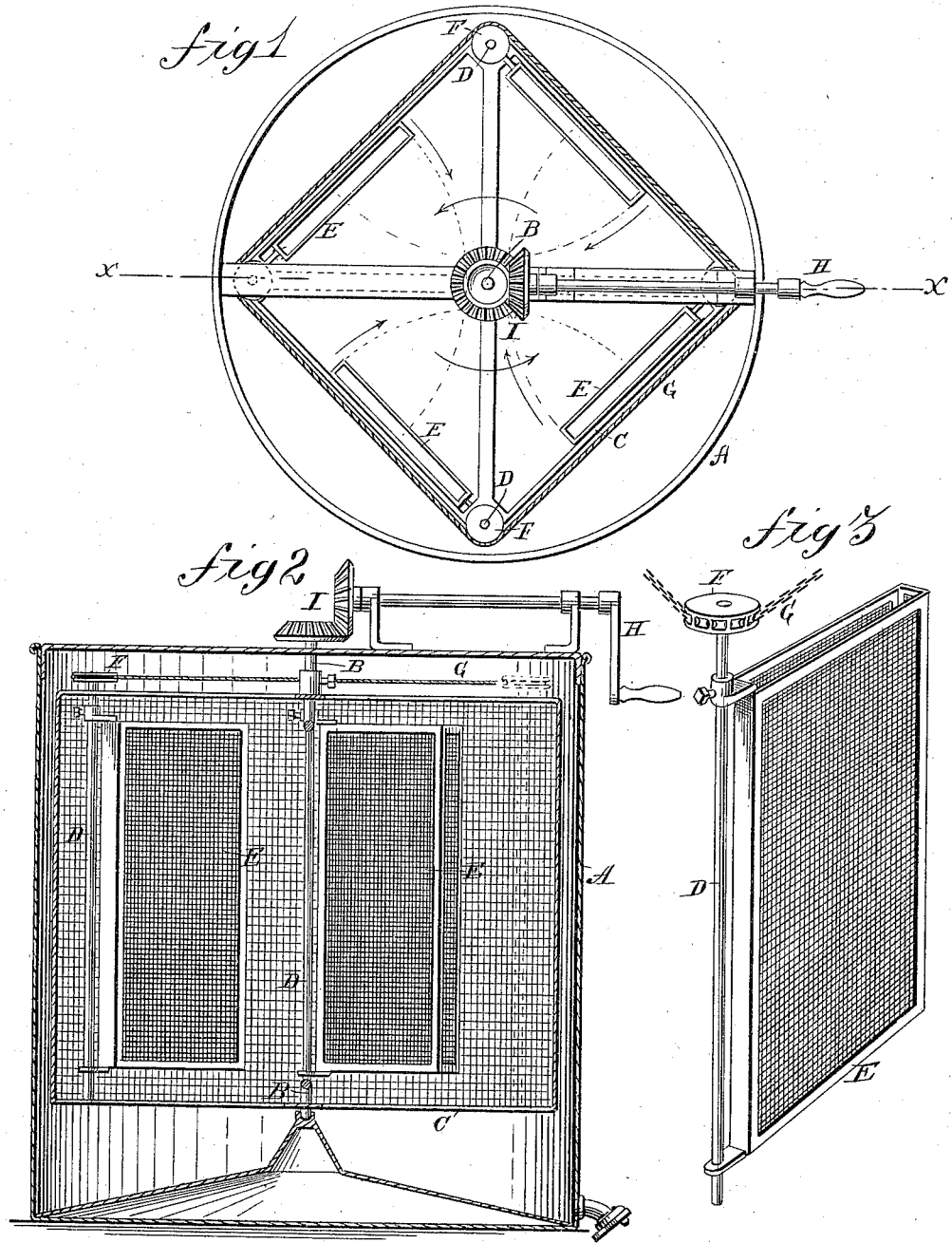

WILLIAM B. TREADWELL, OF NEW YORK, N. Y., ASSIGNOR TO HIMSELF AND JOHN ASPINWALL, OF SAME PLACE.

HONEY-EXTRACTOR.

SPECIFICATION forming part of Letters Patent No. 335,857, dated February 9, 1886.

Application filed October 28, 1885. Serial No. 181,162. (No model.)

*To all whom it may concern:*

Be it known that I, WILLIAM B. TREADWELL, of New York, in the county of New York and State of New York, have invented a new and useful Improvement in Honey-Extractors, of which the following is a full, clear, and exact description, reference being made to the annexed drawings, forming a part thereof, in which—

Figure 1 is a plan view. Fig. 2 is a vertical transverse section taken on line $x\ x$ in Fig. 1. Fig. 3 is a perspective view of one of the comb-pockets with its spindle and chain-wheel. Fig. 4 is a detailed view of one of the wheels, showing the application of a cord to the wheel.

Similar letters of reference indicate the same parts of the different figures of the drawings.

My invention relates to the class of machines employed for separating liquids from solids by centrifugal action, more especially to machines for extracting honey from its comb.

My invention consists in the combination, with the swinging comb-pockets of a honey-extractor, of a device for connecting together the spindles of the swinging pockets, so that when it becomes necessary to reverse the pockets the entire series of pockets may be reversed simultaneously.

In the axis of a cylindrical tank, A, is journaled a shaft, B, to which is secured a rectangular wire-cloth cage, C, in the angles of which are journaled shafts D, carrying wire-cloth pockets E. Each of the four pockets thus carried by the cage C may be turned with its shaft as a center motion, so that it may lie against either of the sides of the cage C adjacent to the angle in which its shaft is journaled. I have prolonged the shafts D above the frame of the cage C, and provided each shaft with a pulley or chain wheel, F. A chain, G, passes round the outer surface of all the chain-wheels, so that when one of the comb-pockets is turned on its axis all the others will be turned in the same manner, thereby saving the trouble and exertion required to turn each one separately.

It is obvious that instead of employing chain-wheels F, I may employ wheels adapted to receive the cord or rope, as shown in Fig. 4, the rope being wound once around the wheel and fastened, or I may employ angled levers and connect the levers by means of ropes or chains.

In the ordinary working of the machine the comb-pockets E all lie in the same direction in the cage with reference to the direction of the rotation of the cage, and the cage is revolved by means of the crank H through the medium of the miter-wheels I. The honey is thrown outward from the comb contained by the pockets and through the walls of the cage C against the walls of the tank A, whence it falls to the bottom of the tank. When no more honey can be extracted from the comb in that position, the comb-pockets E are reversed by drawing the chain G, when the cage C is again revolved and the remainder of the honey is extracted from the comb.

Having thus described my invention, what I claim as new, and desire to secure by Letters Patent, is—

In a honey-extractor, the combination of the cage C, carried by the shaft B, the comb-pockets E, shafts D, journaled in the angles of the cage C, and carrying the comb-pockets, the chain-wheels F, secured to the upper ends of the shafts D, and the chain G, positively engaging the chain-wheels, as herein specified.

WILLIAM B. TREADWELL.

Witnesses:
EDGAR TATE,
GEO. M. HOPKINS.